(12) United States Patent
Balasubramanian et al.

(10) Patent No.: US 10,380,667 B2
(45) Date of Patent: Aug. 13, 2019

(54) COLLABORATIVE DELIVERY DEVICE

(71) Applicant: International Business Machines Corporation, Armonk, NY (US)

(72) Inventors: Swaminathan Balasubramanian, Troy, MI (US); Radha M. De, West Bengal (IN); Ashley D. Delport, Durban (ZA); Indrajit Poddar, Sewickley, PA (US); Cheranellore Vasudevan, Bastrop, TX (US)

(73) Assignee: International Business Machines Corporation, Armonk, NY (US)

( * ) Notice: Subject to any disclaimer, the term of this patent is extended or adjusted under 35 U.S.C. 154(b) by 72 days.

(21) Appl. No.: 15/616,711

(22) Filed: Jun. 7, 2017

(65) Prior Publication Data

US 2018/0357693 A1  Dec. 13, 2018

(51) Int. Cl.
  *B64D 1/22* (2006.01)
  *G05D 1/10* (2006.01)
  (Continued)

(52) U.S. Cl.
  CPC ....... *G06Q 30/0617* (2013.01); *B64C 39/024* (2013.01); *B64D 1/22* (2013.01);
  (Continued)

(58) Field of Classification Search
  CPC ............ B64C 39/024; B64C 2201/128; B64C 2201/146; G06Q 30/0617; G06Q 10/0837;
  (Continued)

(56) References Cited

U.S. PATENT DOCUMENTS

| 2010/0256836 A1* | 10/2010 | Mudalige | G08G 1/163 |
| | | | 701/2 |
| 2013/0103528 A1* | 4/2013 | Carnevale | G06Q 30/02 |
| | | | 705/26.1 |

(Continued)

FOREIGN PATENT DOCUMENTS

CN       204759206 U    11/2015

OTHER PUBLICATIONS

Anonymously; "Secure delivery to recipient mobile phone location for a Semi-Autonomous Vehicle Delivery System"; http://ip.com/IPCOM/000240666D; Feb. 17, 2015.

(Continued)

*Primary Examiner* — Atul Trivedi
(74) *Attorney, Agent, or Firm* — Patterson + Sheridan, LLP

(57) ABSTRACT

Systems and a method for transporting smart shopping bags are provided herein. The system includes a plurality of drones, each of which is operable to travel to a plurality of designated locations to search for smart shopping bags. The smart shopping bags are configured to store goods for transport and are operable to store and wirelessly communicate user preferences, information related to stored goods, and one or more destinations for the goods. Upon finding a smart shopping bag, each of the drones is operable to query the smart shopping bag to determine whether the smart shopping bag is suitable for pickup by the drone. If the smart shopping bag is suitable for pickup, each of the drones is operable to transport the smart shopping bag toward a first one of the one or more destinations.

20 Claims, 10 Drawing Sheets

(51) Int. Cl.
*H04W 4/40* (2018.01)
*H04W 4/80* (2018.01)
*B64C 39/02* (2006.01)
*G06Q 10/08* (2012.01)
*G06Q 30/06* (2012.01)
*G08C 17/02* (2006.01)
*H04L 29/08* (2006.01)

(52) U.S. Cl.
CPC ......... *G05D 1/104* (2013.01); *G06Q 10/0837* (2013.01); *G08C 17/02* (2013.01); *H04L 67/12* (2013.01); *H04L 67/18* (2013.01); *H04W 4/40* (2018.02); *B64C 2201/128* (2013.01); *B64C 2201/146* (2013.01); *G08C 2201/91* (2013.01); *G08C 2201/93* (2013.01); *H04W 4/80* (2018.02)

(58) Field of Classification Search
CPC ........................... G08C 17/02; G08C 2201/91; G08C 2201/93; H04L 67/12; H04W 4/046; H04W 4/80; H04W 8/205
USPC ............................................................ 701/2
See application file for complete search history.

(56) References Cited

U.S. PATENT DOCUMENTS

| | | | |
|---|---|---|---|
| 2014/0136414 A1* | 5/2014 | Abhyanker | G06Q 50/28 705/44 |
| 2014/0152507 A1 | 6/2014 | McAllister | |
| 2015/0120015 A1* | 4/2015 | Fadell | G08B 19/005 700/90 |
| 2015/0120094 A1* | 4/2015 | Kimchi | B64C 39/024 701/3 |
| 2015/0120596 A1* | 4/2015 | Fadell | G08B 27/003 705/330 |
| 2015/0120598 A1* | 4/2015 | Fadell | G06Q 10/083 705/333 |
| 2015/0145643 A1* | 5/2015 | Fadell | G06Q 10/083 340/5.51 |
| 2015/0317597 A1 | 11/2015 | Shucker et al. | |
| 2015/0356885 A1 | 12/2015 | Chen et al. | |
| 2017/0132566 A1* | 5/2017 | High | B64C 39/024 |
| 2017/0293991 A1* | 10/2017 | High | B64C 39/02 |
| 2018/0107211 A1* | 4/2018 | Schubert | G05D 1/0044 |
| 2018/0130017 A1* | 5/2018 | Gupte | G06Q 10/0836 |
| 2018/0170543 A1* | 6/2018 | Luckay | B62D 33/02 |
| 2018/0170729 A1* | 6/2018 | High | E01H 5/12 |
| 2019/0050799 A1* | 2/2019 | Goldberg | G06Q 10/0832 |

OTHER PUBLICATIONS

Radhakrishnan, M. et al.; "IoT+small data: tranforming in-store shopping analytics & services"; 2016 8th International Conference on Communication Systems and Networks (COMNETS), 6 pp.; IEEE; 2016.

* cited by examiner

US 10,380,667 B2

COLLABORATIVE DELIVERY DEVICE

BACKGROUND

The present invention relates to delivery service by drones and, more particularly, to the use of smart shopping bags to affect delivery parameters by the drones.

Drone deliveries are initiated by the delivery service provider or the shop owner, so it is difficult for the delivery recipient to specify personalized requirements, such as delivery times. For example, a package may be delivered by drone when a recipient is not present to retrieve the package. In such circumstances, the package may be vulnerable to theft or damage (e.g., due to rain, heat, and/or cold). Additionally, drone services currently not available for package returns. Even if a package is delivered by drone, the recipient must use a package delivery service to return the package, if necessary.

SUMMARY

According to one embodiment of the present invention,

DETAILED DESCRIPTION

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In embodiments described herein, drones are used in conjunction with smart shopping bags to deliver and/or return packages to consumers. The smart shopping bags are operable to wirelessly communicate with the drones. The smart shopping bag are also operable to store electronic data related to user preferences, information related to goods stored in the smart shopping bag, and/or destination(s) for the good(s). A drone passing proximate to the smart shopping bag can determine whether the smart shopping bag is suitable for transport. As will be discussed in greater detail below, the passing drone can task itself or can be tasked by a central controller to transport the smart shopping bag to a destination or in the direction of a destination in accordance with the user preferences. The smart shopping bag, in conjunction with the drones, can be used for both deliveries to a recipient and returns from the recipient. As a result, packages can be delivered to a recipient in accordance with that recipient's preferences. Additionally, packages can be returned in an easy manner that does not require the recipient to transport the package to a package delivery service provider for return.

Figure 1B:
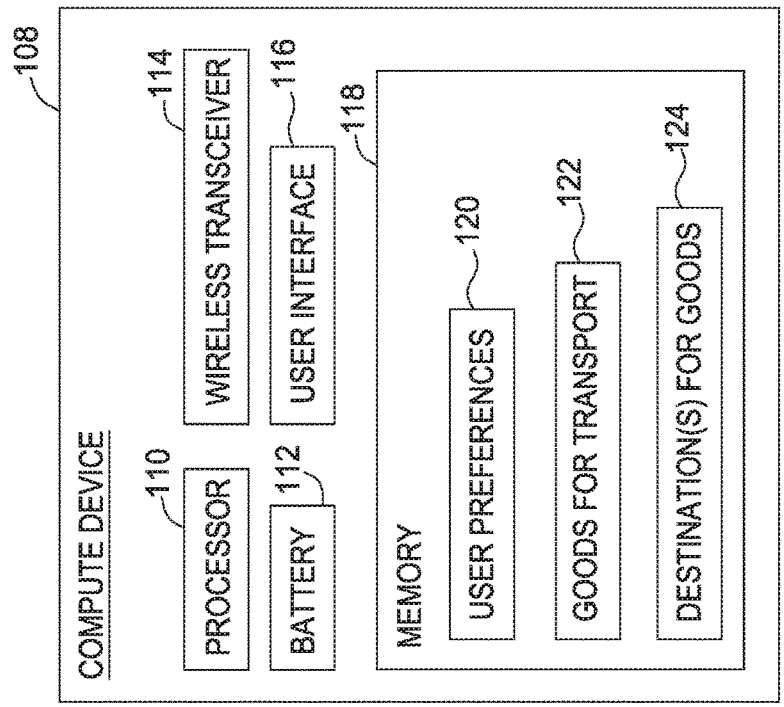
FIG. 1B is a block diagram of the compute device for the smart shopping bag of FIG. 1A.
Figure 1A:
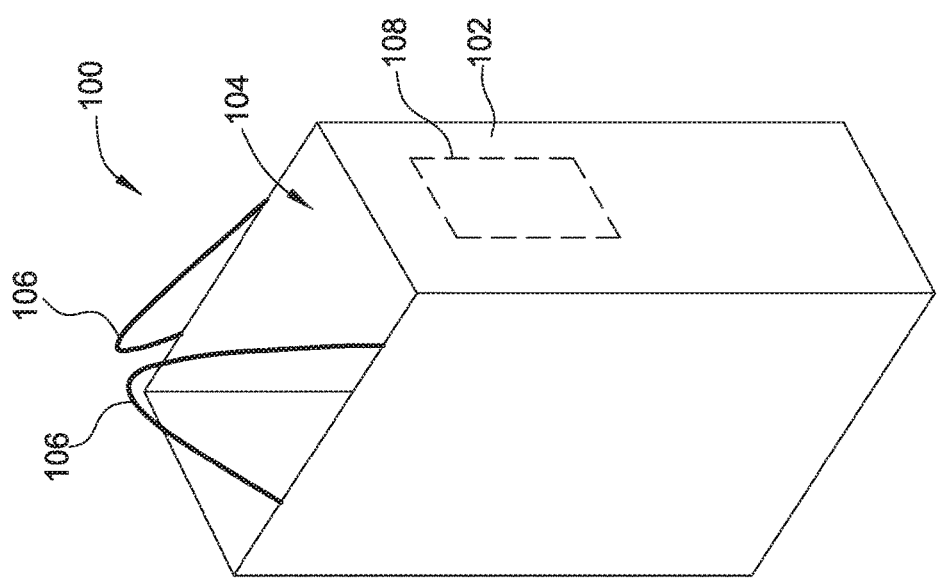
FIG. 1A is a perspective view of a smart shopping bag according to at least one embodiment.

FIG. 1A is a perspective view of a smart shopping bag 100 according to one embodiment. The smart shopping bag 100 includes a body 102 that forms a storage volume 104 in which packages may be placed for transport. The smart shopping bag 100 also includes a drone engagement interface 106. In the illustrated embodiment, the drone engagement interface 106 comprises handles that a drone may engage (e.g., using a hook). In the case of an aerial drone, the aerial drone may lift the smart shopping bag 100 after a hook or other grasping device of the drone engages the drone engagement interface 106. The smart shopping bag 100 illustrated in FIG. 1A is illustrated as a bag. In various other embodiments, the smart shopping bag 100 comprises a box or other suitable container, and the term "smart shopping bag" is intended to encompass such boxes or other suitable containers. In at least some embodiments, the body 102 of the smart shopping bag 100 is made of a lightweight, durable material, such as nylon fiber fabric, polyester fiber fabric, aramid fiber fabric, and/or carbon fiber fabric.

Referring primarily to FIG. 1B, the smart shopping bag 100 includes a compute device 108 that is operable to communicate with the drones and/or with various entities that use the smart shopping bag 100. For example, the entities that may use the smart shopping bag 100 include a person to whom the smart shopping bag 100 is assigned (e.g., a consumer that uses the smart shopping bag 100 to have packages delivered and/or to return packages). The entities may also include merchants that receive the smart shopping bag 100 to place purchased items in the storage volume 104 for transport to the recipient and/or to remove returned items from the storage volume. The compute device 108 includes a processor 110, a computer memory 118, and a battery 112 that powers the compute device 108. The computer memory 118 is configured to store information related to user preferences 120. The user preferences 120 could include preferred or required delivery times and or delivery parameters. For example, a person may specify that deliveries be made to their house only after 6:00 PM or before 10:00 AM. As another example, a person may specify that deliveries to the house only be made if someone is home to receive the delivery. As another example, a person may specify that deliveries to the house only be made if someone is home to receive the delivery if the value of the item(s) being delivered exceeds a threshold value.

The computer memory 118 is also configured to store information related to the goods for transport 122 (e.g., goods that are in the storage volume 104 of the smart shopping bag 100). As will be discussed in greater detail below, the compute device 108 can receive indications of the items that are placed in the storage volume 104, and such indications can be stored in the computer memory 118. The indications about the goods for transport 122 can include identification of the goods as well as weights of the goods. The total weight of the goods for transport 122 may be important in circumstances in which the drones have a limited weight-carrying capacity. The goods for transport 122 information stored in the computer memory 118 may also include a history of recently-transported goods. Such a stored history may be used to recall items that were recently transported in the event such items are to be returned or such items are to be transported again (e.g., repurchased).

The computer memory 118 is also configured to store information related to destinations for the goods 124. In the embodiments described herein, a drone or drones may be able to deliver the smart shopping bag 100 to a plurality of different merchants. For example, the smart shopping bag may be picked up by a first drone at a consumer's house and transported to a first merchant so that the first merchant can place a purchased item in the storage volume 104 in the smart shopping bag 100. Thereafter, a second drone may transport the smart shopping bag 100 to a second merchant so that the second merchant can remove a returned item from the storage volume 104 in the smart shopping bag 100. A third drone may then transport the smart shopping bag 100 back to the consumer's house to deliver the item purchased from the first merchant. In such a scenario, the information related to destinations for the goods 124 stored in the computer memory 118 could include the street addresses coordinates, and/or other location information associated with the consumer's house, the first merchant, and the second merchant. The stored information related to destinations for the goods 124 in the computer memory 118 could also store an ordering of the location information, indicating the next destination for the smart shopping bag 100.

The compute device 108 also includes a wireless transceiver 114 that is operable to communicate with the drones and/or to communicate with other devices operated by the entities that use the smart shopping bag 100. The wireless transceiver 114 may operate in accordance with one or more short range wireless protocols, such as Bluetooth low energy (BLE), light fidelity (Li-Fi), near field communication (NFC), Wi-Fi, Wi-Fi Direct, Z-Wave®, and/or ZigBee®.

Additionally, or in the alternative, the wireless transceiver 114 may operate in accordance with one or more medium-range wireless protocols, such as HaLow™ and/or LTE Advanced. Additionally, or in the alternative, the wireless transceiver 114 may operate in accordance with one or more long-range wireless protocols, such as low-power wide area networking (LPWAN) and/or very small aperture terminal (VSAT).

The compute device 108 of the smart shopping bag 100 may use one or more of the above-described exemplary communication protocols or other communication protocols to wirelessly communicate information to drones in suitable proximity (i.e., within communication range) to the smart shopping bag 100. The compute device 108 of the smart shopping bag 100 may also use one or more of the communication protocols to communicate with devices within the consumer's house and/or within a merchant's warehouse. For example, as discussed above, the user preferences 120 stored in the computer memory 118 may request that deliveries only be made to the user's house if someone is home to receive the delivery. In such circumstances, the wireless transceiver 114 can communicate with other devices in the user's house capable of wireless communication to determine if someone is in the user's house. For example, the wireless transceiver 114 could communicate with a security system or a "smart" thermostat, either of which may include motion sensors to detect the presence of people within the house. As another example, the wireless transceiver 114 could communicate with a personal computer in the user's house (e.g., via Wi-Fi or Bluetooth) to receive the information related to the goods for transport 122 and/or the destinations for the goods 124 to be stored in the computer memory 118. As another example, the wireless transceiver 114 could communicate with wireless devices within a merchant's warehouse or other facility. For example, the wireless transceiver could communicate with a conveyor system that routes the smart shopping bag 100 in the warehouse to a particular area to remove an item from the storage volume 104 or to place an item in the storage volume 104.

In at least one embodiment, the compute device 108 includes a user interface 116. The user interface 116 may be used by the user to enter and/or change user preferences 120, input information related to goods for transport 122, and/or input information related to destinations for the goods for transport 124. In one embodiment, the user interface 116 may include a touchscreen display that the user can operate to enter and/or change user preferences 120, input information related to goods for transport 122, and/or input information related to destinations for the goods for transport 124. In at least one embodiment, a user may be able to initiate a purchase or a return solely using the user interface 116 (i.e., without using another computer). For example, if the user wishes to return an item that was previously purchased and delivered via the smart shopping bag 100, the user may use the user interface 116 to select the item from a list of item stored in a transport history in the computer memory 118, discussed above. Thereafter, the user may place the item in the storage volume 104 of the smart shopping bag 100 and place the smart shopping bag 100 in a location accessible by a drone, such as a backyard or front yard area. As another example, if the user wishes to purchase an item, the user may identify the item for purchase using the user interface 116. For example, in some instances, a merchant may only offer a limited selection of items for delivery via drone. For example, a merchant likely would not offer heavy and/or bulky items for delivery via drone. The compute device 108 could communicate with a computer system for the merchant (via an Internet connection at the user's residence) to retrieve and display the limited selection of items available for drone delivery on the touch screen display user interface 116.

Figure 2:
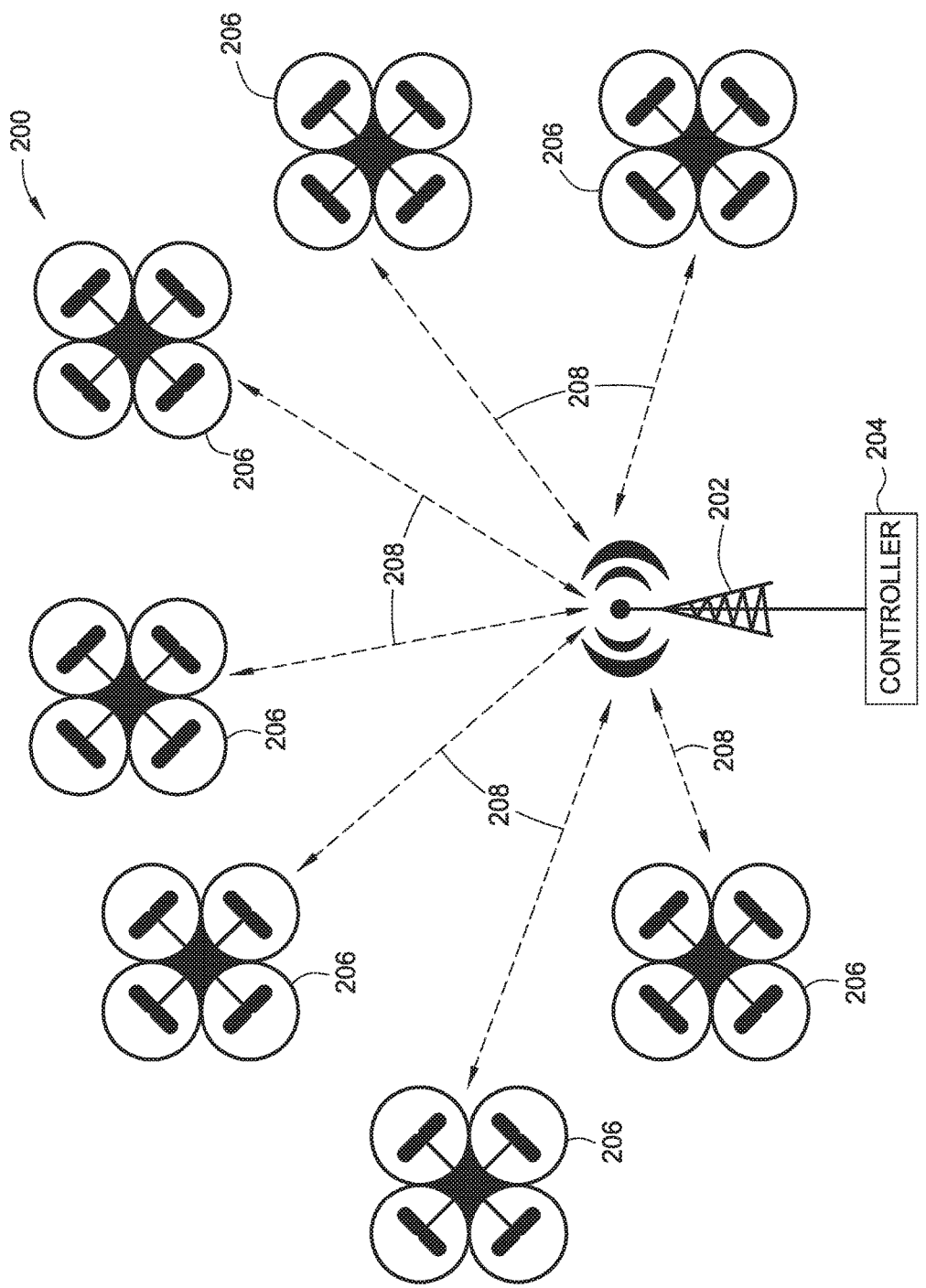
FIG. 2 is a schematic diagrams of a system that includes a controller and a wireless transceiver, wherein the controller is in communication, via the wireless transceiver, with a plurality of drones.

FIG. 2 illustrates a system 200, according to at least one embodiment, for controlling a plurality of drones 206 that transport smart shopping bags 100. The system 200 includes a wireless transceiver 202 communicatively coupled to a controller 204. The controller 204 is in communication, via the wireless transceiver 202, with the plurality of drones 206. In the illustrated aspect in FIG. 2, the drones 206 are depicted as aerial drones and more particularly as quad copters. In various other embodiments, the drones 206 could include other types of drones, such as land-based drones, water-based drones, and/or track-based drones. Additionally, the wireless transceiver 202 is depicted as a single wireless transceiver 202. In at least one embodiment, the wireless transceiver 202 could be a plurality of wireless transceivers 202 distributed over an area. For example, in one embodiment, the wireless transceiver 202 could include a plurality of antennae mounted to cellular antenna towers, and drones 206 could communicate with a closest wireless transceiver antenna.

As discussed above, in one embodiment, the drones 206 may communicate with the smart shopping bags 100 when the drones 206 are within range to receive signals from the smart shopping backs 100. In turn, the drones 206 may transmit information received from the smart shopping bags 100 to the controller 204 via the wireless transceiver 202. For example, a drone 206 may receive an indication from a smart shopping bag 100 that the smart shopping bag is ready for transport from its current location (i.e., a first location) to a second location. The drone 206 can transmit the indication to the controller 204 via the wireless transceiver. In response, the controller 204 can task one or more of the plurality of drones 206 to transport the smart shopping bag 100 from the first location to the second location. In one scenario, the controller 204 may task one of the plurality of drones 206 to transport the smart shopping bag 100 from the first location of the second location. In another scenario, the controller 204 may task multiple ones of the plurality of drones 206 to transport the smart shopping bag 100 from the first location and the second location. For example, the controller 204 may task a first one of the plurality of drones 206 to transport the smart shopping bag 100 from the first location to an intermediate location and may task a second one of the plurality of drones 206 to transport the smart shopping bag 100 from the intermediate location to an end location. As another example, the controller 204 may task two or more drones 206 to transport the smart shopping bag 100 if the weight of the smart shopping bag 100 exceeds the carrying capacity of a single drone 206.

In at least one embodiment, the controller 204 tasks different ones of the plurality of drones 206 to fly different respective routes such that the plurality of drones 206 adequately cover an area, such as a town, neighborhood, city, state, or country. The controller 204 may transmit different routes to the respective ones of the plurality of drones 206, wherein each route includes a sequence of waypoints indicating a latitude, longitude, and altitude for the drone at that waypoint. The waypoints for the routes may be selected such that the drones 206 pass over houses or other structures that are associated with subscriptions for the drone delivery service provided by the system 200. The routes can include changes in altitude such that the drones 206 pass close enough to the houses or other structures to wirelessly communicate with the smart shopping bags 100 as the drones 206 pass over the houses or other structures.

Figure 3:
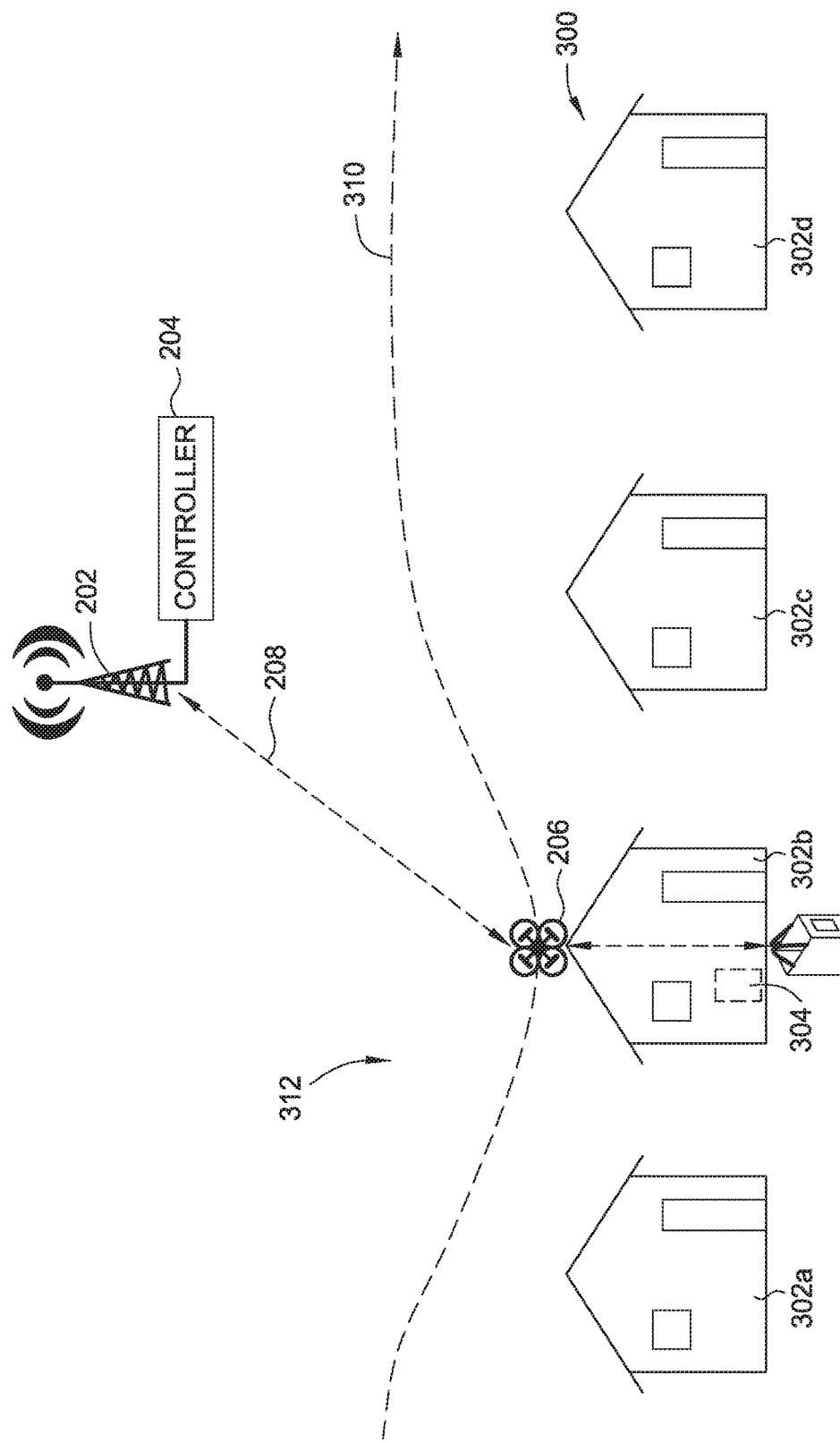
FIG. 3 is a schematic side view diagram illustrating a drone passing proximate to a location of a smart shopping bag.

FIG. 3 is a side schematic view, depicting a scenario of a drone 206 of the plurality of drones 206 flying along a route 310. In the illustrated scenario, the route 310 includes waypoints such that the drone 206 flies over a row of houses 300. One of the houses 302b is associated with a subscription for the drone delivery service provided by the system 200. In the event the occupant(s) of the house 302b want to use the drone delivery service, the occupant(s) may program the smart shopping bag 100, as described above, by using the user interface 116 of the compute device 108. Alternatively, the occupant(s) may program the smart shopping bag 100 by using a computer 304 (e.g., a desktop computer, a laptop computer, a tablet computer, and/or a smart phone). The computer 304 can output program instructions to the smart shopping bag 100 via wireless data transmissions. For example, the computer 304 could communicate directly with the smart shopping bag 100 via a short range wireless protocol, such as Bluetooth. As another example, the computer 304 could communicate with the smart shopping bag 100 via a Wi-Fi router associated with the house 302b and to which both the computer 304 and the smart shopping bag 100 are connected. After the smart shopping bag 100 is programmed with applicable user preferences 120, information related to the goods for transport 122, and/or information related to destination(s) for goods 124, the occupant(s) places the smart shopping bag 100 in a location that is suitable for pickup by a drone 206. For example, the occupant(s) could place the smart shopping bag 100 and a front yard, a backyard, a deck, or other accessible area of the house 302b. As another example, in a city environment where outdoor environments such as yards may be unavailable, occupant(s) could place the smart shopping bag 100 on a roof of a house or apartment building.

The drone 206 may fly at a generally-high altitude along the route over the houses 302a, 302c, and 302d, which do not use the drone delivery service provided by the system 200, to mitigate noise effects on occupants of those houses. For example, the drones 206 may typically fly an altitude of 100 feet, 200 feet, 300 feet, 400 feet, or another suitable altitude at which the passing of the drone 206 results in little to no nuisance for the occupants of the houses 302a, 302c, and 302d. However, such high altitudes may place the drone 206 outside the range of the wireless transceiver 114 of the smart shopping bag 100. Thus, the route 310 for the drone 206 includes an altitude reduction 312 proximate to the house 302b so that the drone 206 can try to wirelessly communicate with the smart shopping bag 100. In one embodiment, the drone 206 following the route 310 may always perform the altitude reduction 312 when proximate to the house 302b to look for a smart shopping bag 100. In another embodiment, the drone 206 may only perform the altitude drop 312 if there is an indication that the smart shopping bag 100 may be ready for pickup and transport. For example, in one embodiment, the controller 204 may include an Ethernet connection such that the controller 204 can communicate with other computers over the Internet. When the occupant(s) of the house 302b indicates on the smart shopping bag 100 or on the computer 304 that the smart shopping bag 100 is ready for transport, the controller 204 could send a signal to the drone(s) 206 flying the route 310 to begin looking for the smart shopping bag 100 at the house 302b. Thereafter, when the drone(s) 206 flying the route 310 are proximate to the house 302b, the drone(s) 206 will perform the altitude drop 312 to try to communicate with the smart shopping bag 100. When a drone 206 communicates with the smart shopping bag 100 and receives an indication that the smart shopping bag 100 is suitable for transport, the drone 206 can communicate that indication to the controller 204 via the wireless transceiver 202.

In at least some scenarios, the controller 204 may instruct or task the drone 206 that receives the indication from the smart shopping bag 100 to pick up the smart shopping bag 100 and transport it. However, in some scenarios, the controller 204 may instruct or task a different drone 206 to pick up the smart shopping bag 100 and transport it. For example, the items in the smart shopping bag 100 may exceed the weight carrying capability of the drone 206 such that the smart shopping bag 100 is not suitable for that drone. For example, if the drone 206 that receives the indication from the subject smart shopping bag 100 is already carrying other smart shopping bags 100, then that drone 206 may not have enough capacity to carry the weight of the subject smart shopping bag 100. In such a scenario, the controller 204 may instruct a different drone 206 to pick up the smart shopping bag.

Figure 4:
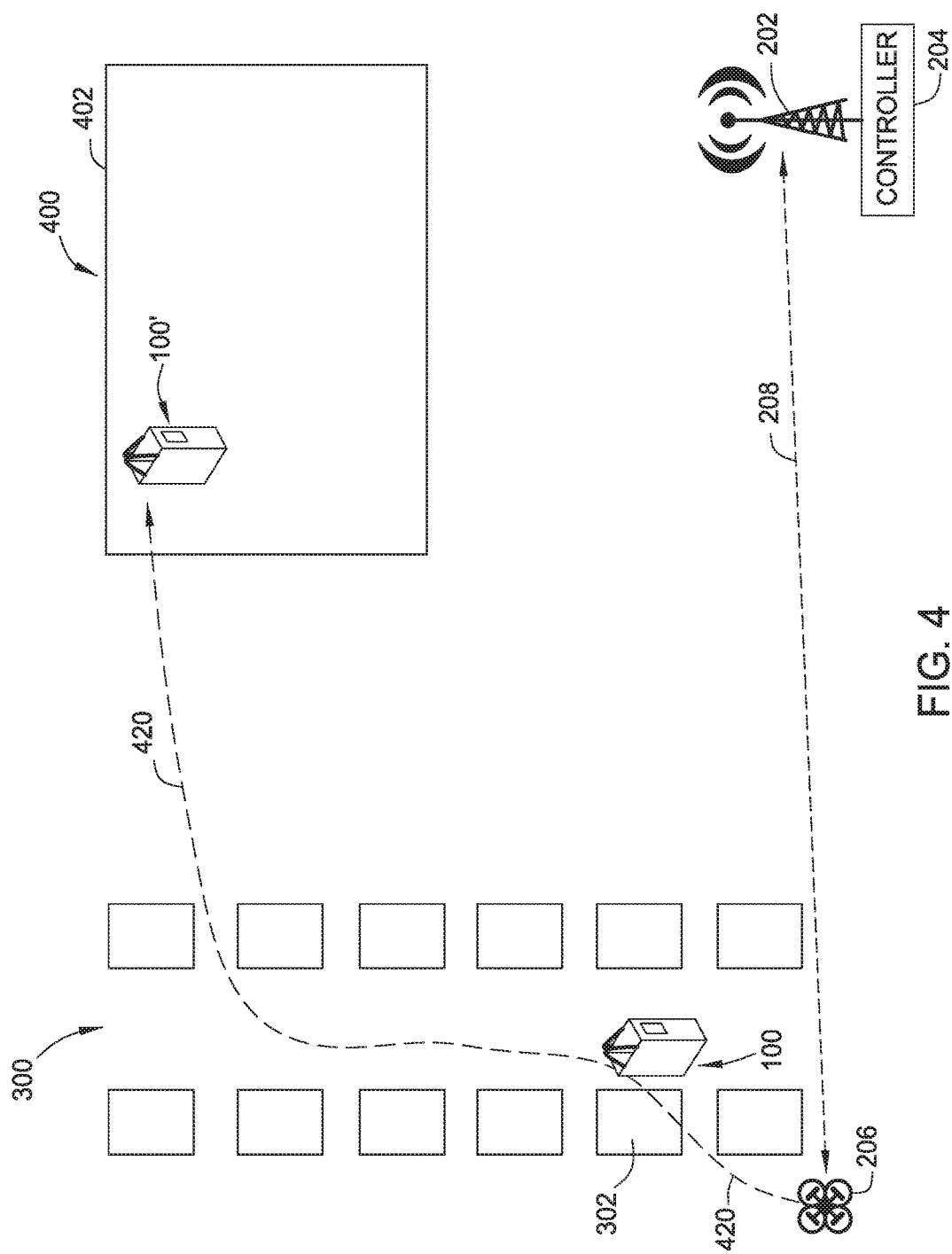
FIG. 4 is a schematic top view diagram illustrating a drone retrieving a smart shopping bag from a first location and delivering the smart shopping bag to a second location, based on tasking from the controller of FIG. 2.

FIG. 4 is a top schematic view of a scenario in which a single drone 206 receives an indication that a smart shopping bag 100 is suitable for transport and transports the smart shopping bag 100 to a destination. In this scenario, a drone 206 is following a route 420 along the row of houses 300. The route 420 passes over a particular house 302 that uses the drone delivery service of the system 200. After the occupant(s) of a particular house 302 places the smart shopping bag 100 outside of the house 302, the drone 206 passing over the house 302 detects that the smart shopping bag 100 is ready for transport. Thereafter, the drone 206 communicates to the controller 204, via wireless signal 208 and the wireless transceiver 202, that the smart shopping bag 100 is ready for transport. The transmission from the drone 206 to the controller 204 could include the destination for the smart shopping bag 100. In the exemplary scenario, the destination is a merchant location 400 that includes a warehouse 402. In response to receiving the destination from the drone 206, the controller 204 instructs the drone to either continue flying its route or to pick up the smart shopping bag 100. In the illustrated scenario, the controller 204 instructs or tasks the drone 206 to pick up the smart shopping bag 100. As discussed above, the drone 206 may include a hook or other grasping implement that can engage the drone engagement interface 106 of the smart shopping bag 100 to carry the smart shopping bag 100. Thereafter, the drone 206 follows the route 420 to transport the smart shopping bag to the warehouse 402. After the drone 206 releases the delivered smart shopping bag 100' at the warehouse 402, the drone 206 can return to its original route, flying over the row of houses 300, or may be tasked to follow a different route.

The scenario depicted in FIG. 4 may be performed in a circumstance where the occupant of the house 302 is returning an item or items to the warehouse 402. The scenario depicted in FIG. 4 may also be followed in a circumstance where the occupant of the house 302 is sending the smart shopping bag 100 to the warehouse 402 so that the merchant operating the warehouse 402 can place purchased items in the storage volume 104 of the smart shopping bag 100. After items are placed in and/or removed from the smart shopping bag 100 at the warehouse 402, the smart shopping bag 100 would be returned to the house 302 via a drone 206.

Figure 5:
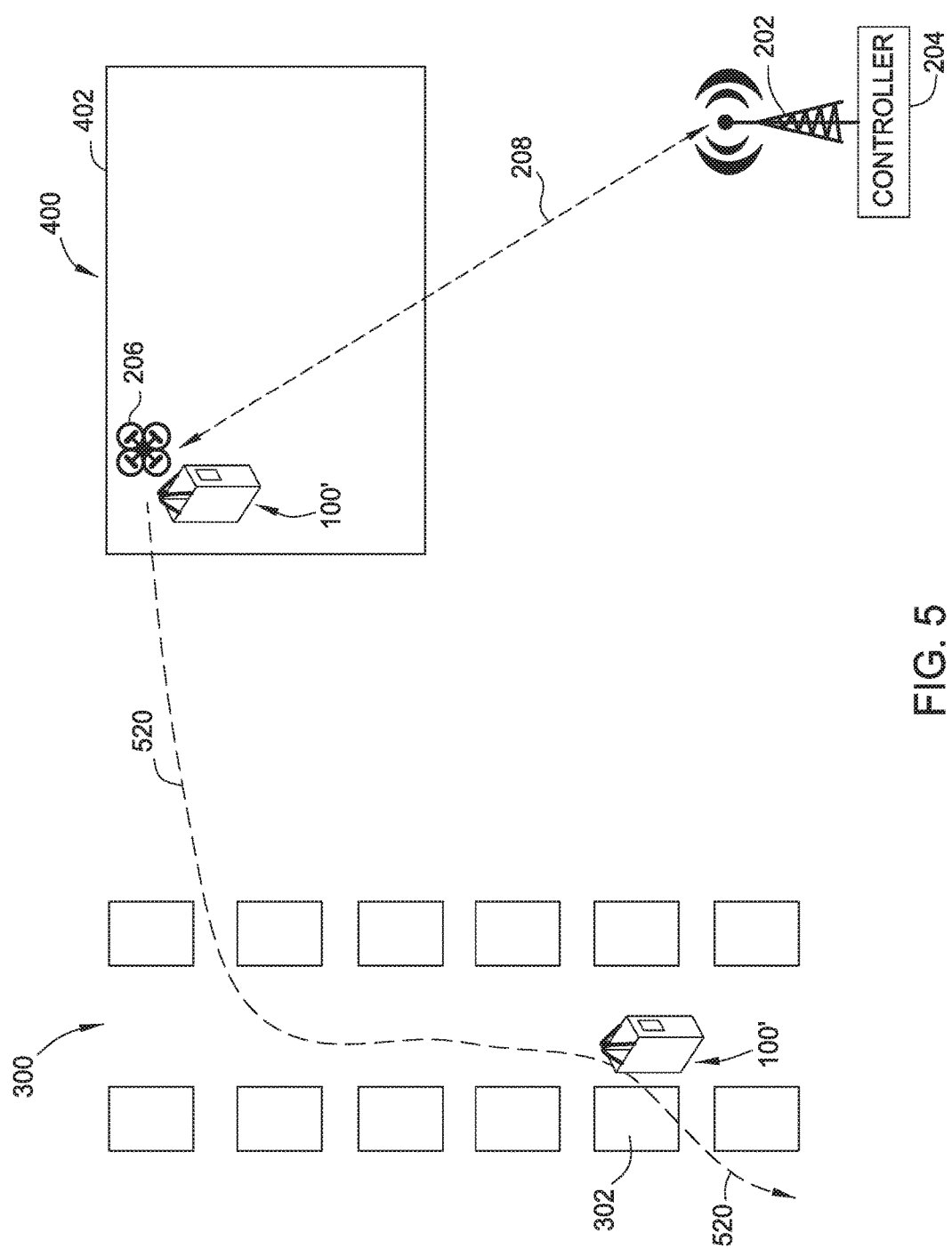
FIG. 5 is a schematic top view diagram illustrating a drone retrieving a smart shopping bag from the second location (of FIG. 4) and delivering the smart shopping bag to the first location (of FIG. 4), based on tasking from the controller of FIG. 2.

FIG. 5 is a top schematic view of a scenario in which a drone 206 determines that a smart shopping bag 100 is ready to be delivered from the warehouse 402 to a house 302. In the exemplary scenario, the smart shopping bag 100 is located at the warehouse 402 after an item was returned to the warehouse 402 and/or an item(s) from the warehouse 402 was placed in the storage volume 104 of the smart shopping bag 100. In this scenario, a drone 206 is tasked by the controller 204 retrieve smart shopping bags 100 from the warehouse 402. In at least one embodiment, the warehouse 402 may have a sufficient volume of deliveries via smart shopping bag 100 to justify having a queue of drones 206 waiting for smart shopping bags 100. In other embodiments, the controller may task drones 206 to pass over the warehouse 402 to wirelessly scan for smart shopping bags 100 for transport.

Upon the smart shopping bag 100 being ready for transport, an indication from the smart shopping bag 100 could be communicated from the smart shopping bag 100 to the drone 206. Thereafter, the drone 206 communicates to the controller 204, via wireless signal 208 and the wireless transceiver 202, that the smart shopping bag 100 is ready for transport. The transmission from the drone 206 to the controller 204 could include the destination (e.g., home address) for the smart shopping bag 100. In the exemplary scenario, the destination is a merchant location 400, such as a warehouse 402. In response, the controller 204 instructs the drone 206 to pick up the smart shopping bag 100. As discussed above, the drone 206 may include a hook or other grasping implement that can engage the drone engagement interface 106 of the smart shopping bag 100 to carry the smart shopping bag 100. Thereafter, the drone 206 follows the route 520 deliver the smart shopping bag to the house 302. After the drone 206 releases the delivered smart shopping bag 100' at the house 302, the drone 206 can return to the warehouse 402 or may be tasked to fly a different route. Additionally, the drone 206 can transmit a delivery signal to the controller 204 via the wireless transceiver 202. In response to receiving the delivery signal from the drone 206, the controller 204 can transmit a delivery indication via the Internet to the house 302 (e.g., to a computer 304 or other connected device in the house 302).

In various scenarios, it may be impractical or impossible for a single drone 206 to carry a smart shopping bag 100 from an origin location to a destination location. For example, a single drone 206 may not have sufficient range to transport a smart shopping bag 100 from an origin location to a destination location. As another example, a drone 206 may be transporting a first smart shopping bag 100 that is heading to a first destination location, and a second smart shopping bag 100 that is subsequently picked up by the drone 206 may be heading to a second destination location, wherein the drone 206 would have to fly in different directions to reach to first and second destination locations. As another example, the controller 204 may task different drones 206 with flying certain patterns to ensure adequate drone coverage over a region and a particular drone 206 may have to depart its designated region to transport a smart shopping bag 100 from an origin location to a destination location. In such scenarios (or other scenarios), the controller 204 may task different drones 206 to transport a smart shopping bag 100 for different portions of a trip from an origin location to a destination location.

In addition to using drones 206, the controller 204 could task other transportation elements to transport the smart shopping bag for portions of a trip from an origin location to a destination location. For example, a first drone 206 could pick up the smart shopping bag 100 at a consumer's house and deliver the bag to a first hub. At the first hub, the smart shopping bag 100 could be placed on board another transportation element, such as a freight train, container ship, aircraft, truck, or van. The transportation element then transports the smart shopping bag 100 to the destination location or to a second hub. If the smart shopping bag 100 is transported to a second hub, other transportation elements or other drones 206 may carry the smart shopping bag to subsequent hubs and/or to the destination location.

Figure 6:
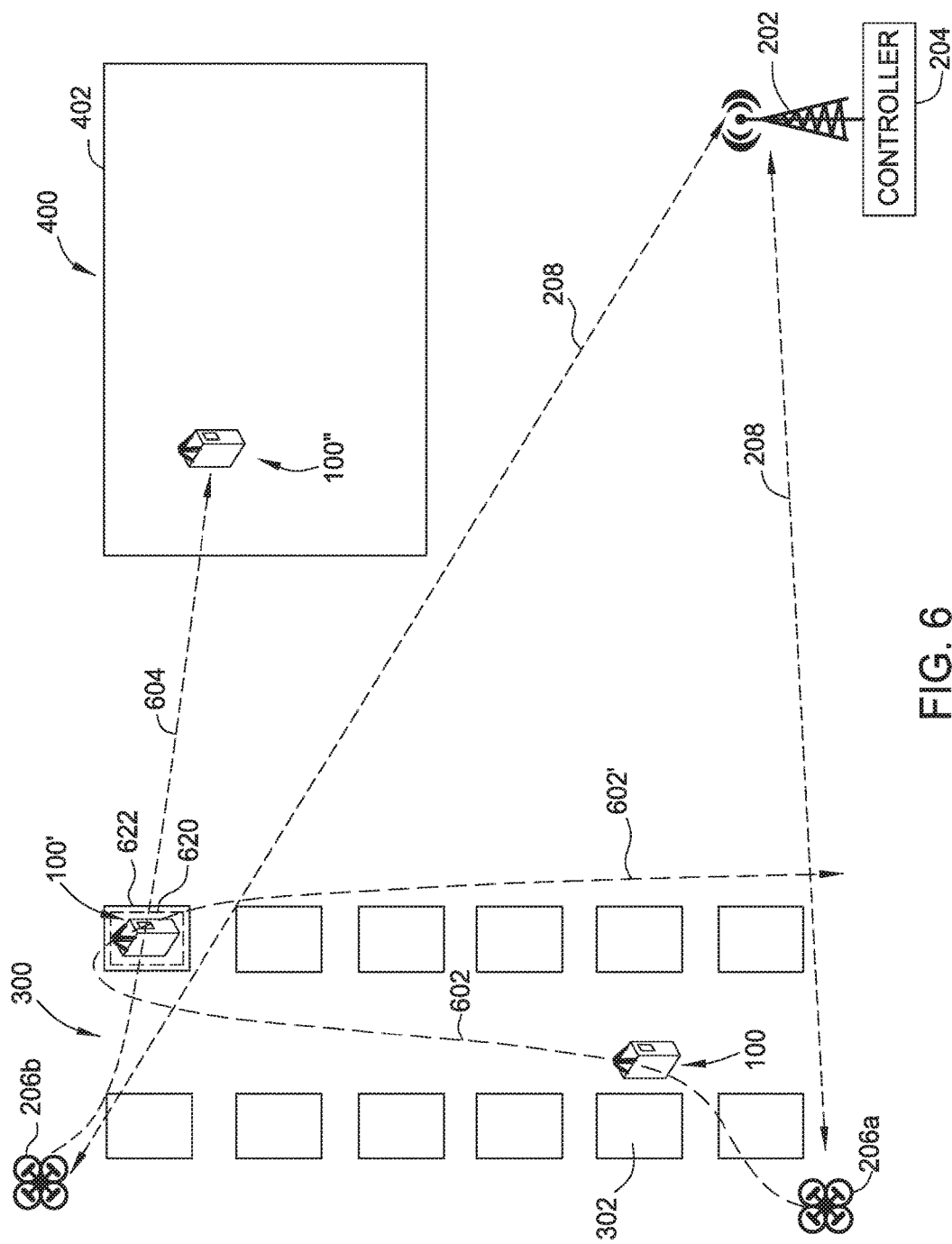
FIG. 6 is a schematic top view diagram illustrating a first drone retrieving a smart shopping bag from the first location (of FIG. 4) and delivering the smart shopping bag to an intermediate location, and a second drone retrieving the smart shopping bag from the intermediate location and delivering the smart shopping bag to the second location (of FIG. 4), based on tasking from the controller of FIG. 2.

FIG. 6 illustrates a scenario in which a smart shopping bag 100 is to be transported from a house 302 to a warehouse 402, and locations of the house 302 and the warehouse 402 makes it impractical or impossible for a single drone 206 to transport the smart shopping bag 100 the entire trip. In this scenario, a first drone 206a is following a route 602 along the row of houses 300. The route 602 passes over the particular house 302 that subscribes to a drone delivery service provided by the system 200. After the occupant(s) of the particular house 302 places the smart shopping bag 100 outside of the house 302, the first drone 206a passing over the house 302 detects that the smart shopping bag 100 is suitable for transport. Thereafter, the first drone 206a communicates to the controller 204, via wireless signal 208 and the wireless transceiver 202, that the smart shopping bag 100 is ready for transport. The transmission from the first drone 206a to the controller 204 could include the destination for the smart shopping bag 100. In response, the controller 204 determines that the first drone 206a cannot transport the smart shopping bag 100 all the way to the warehouse 402. As a result, instead of tasking the first drone 206a to transport the smart shopping bag 100 to the warehouse 402, the controller 204 tasks the first drone 206a to transport the smart shopping bag to an intermediate location 622.

In a least one embodiment, the intermediate location 622 may be any location at which the first drone 206a can release and leave the smart shopping bag 100 for a second drone 206b to subsequently pick up and continue transporting. The intermediate location 622 can include a secure area 620 in which the smart shopping bag 100 is protected from theft, damage, or other loss. For example, the secure area 622 could be a fenced-in area in an area controlled by a company operating the drones 206. As another example, the intermediate location 622 could be a house of a subscriber to the drone service, and the secure area 620 could be a rooftop of the house that is inaccessible to the general public. As another example, the secure area 620 of the intermediate location 622 could be a rooftop of a commercial building, and the drone service could lease the rooftop for use as an intermediate location.

After the first drone 206a has transported the smart shopping bag 100' to the intermediate location 622, the controller 204 tasks the second drone 206b to fly a route 604 over the intermediate location 622 that terminates at the warehouse 402. The second drone 206b can pick up the smart shopping bag 100' from the intermediate location 622 along the route 604 and thereafter deliver the smart shopping bag 100'' to the warehouse 402.

In the exemplary scenario depicted in FIG. 6, the smart shopping bag 100 is transported to a single intermediate location. In various other embodiments and scenarios, the smart shopping bag 100 may be delivered to a series of intermediate locations to be transported from the origin location to the destination location.

Transporting packages to and from consumers using smart shopping bags 100 in conjunction with drones 206 may improve certain aspects of electronic shopping. For example, currently, if a person orders certain goods from a first merchant and orders certain other goods from a second merchant, the first and second merchants ship the respective goods separately. The resulting duplication of shipping and handling activities increases the overall costs to the consumer. As another example, currently, if a person orders certain goods from a first merchant and then subsequently orders additional goods from that same merchant, the two sets of ordered goods are shipped separately. Again, the resulting duplication of shipping and handling activities increases the overall costs of the consumer. The use of a smart shopping bag 100 in conjunction with drones 206 may alleviate both of these excess shipping and handling costs.

Figure 7:
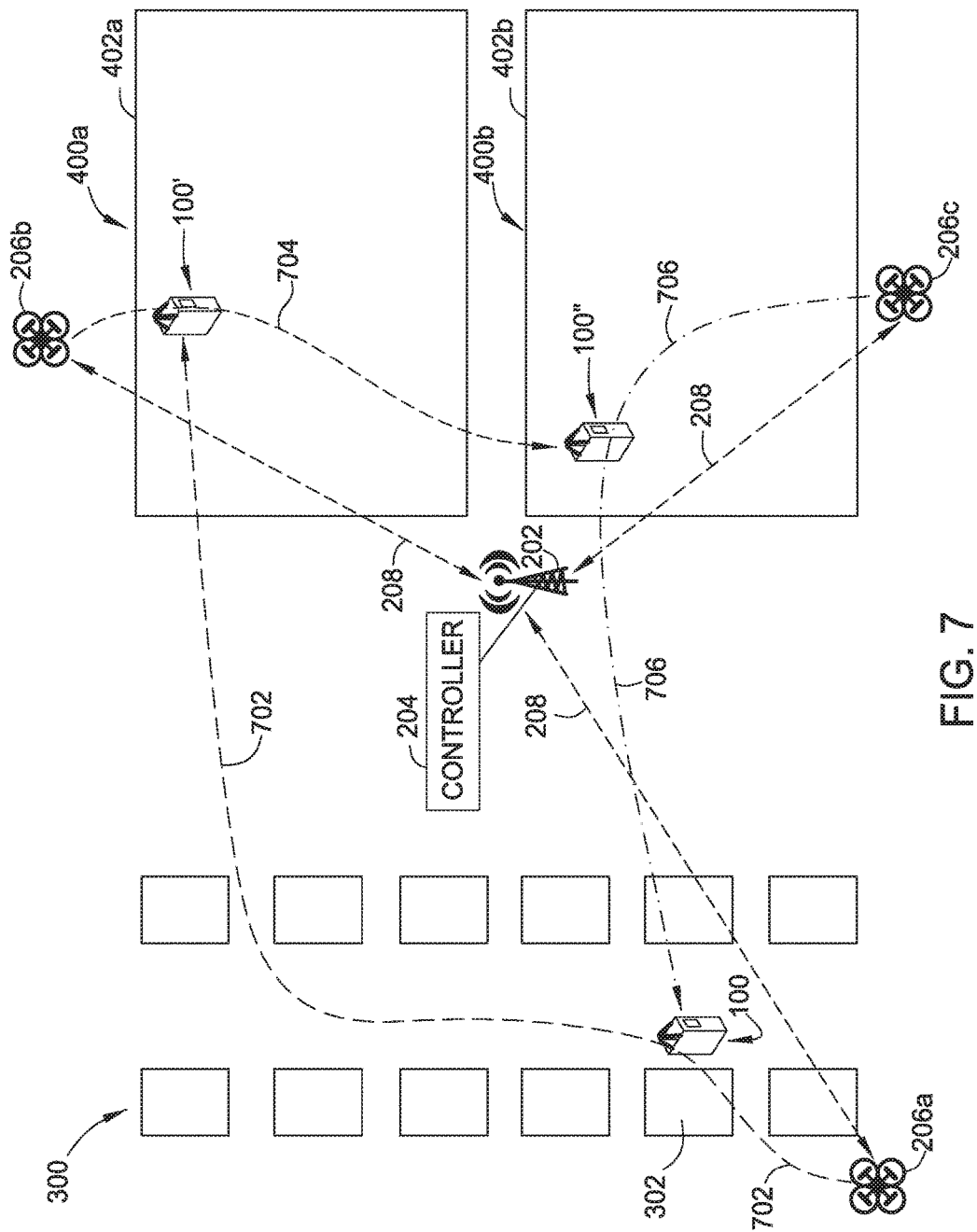
FIG. 7 is a schematic top view diagram illustrating a plurality of drones transporting a smart shopping bag between respective locations, based on the tasking from the controller of FIG. 2.

FIG. 7 illustrates a scenario in which a smart shopping bag 100 is used to deliver goods from different merchants and, optionally, to deliver goods from separate orders from a one of the merchants. After the consumer places an order for the goods from a first merchant 400a, the consumer places there smart shopping bag 100 and a location outside of their house 302 for pickup. A first drone 206a flying a route 702 over the row of houses 300 detects that the smart shopping bag 100 is suitable for transport and communicates that suitability to the controller 204. The controller 204 subsequently tasks the first drone 206a to transport the smart shopping bag 100 from the house 302 to the first warehouse 402a. Once the first drone 206a leaves the smart shopping bag 100' at the first warehouse 402a, workers and/or machines in the warehouse 402a can place the ordered goods in the storage volume 104 of the smart shopping bag 100'. For example, as described above, the computer device 108 of the smart shopping bag 100 can include goods for transport 122 stored in its memory 118. Computer devices associated with the first warehouse 402a could communicate with the compute device 108 of the smart shopping bag 100 via the wireless transceiver 114 to identify the goods for transport 122 that should be placed in the storage volume 104. The computer devices associated with the first warehouse 402a can then move the smart shopping bag 100' to a location or locations in the warehouse 402a in which those goods can be placed in the storage volume 104.

In an exemplary scenario, after the first drone 206a has picked up the smart shopping bag 100 from the house 302, the consumer may decide to order an additional item from the first merchant 400a. The additional item could be communicated to the controller 204 (e.g., via the Internet), and the controller 204 could communicate the additional item to the first drone 206a. The first drone 206a could then communicate the item to the compute device 108 of the smart shopping bag 100 such that the computer device 108 can store the identity of the item in the goods for transport 122 in the computer memory 118. Then, when the smart shopping bag 100' is at the first warehouse 402a, the computers associated with the first warehouse 402a could place the additional item in the storage volume 104 of the smart shopping bag 100'.

In another exemplary scenario, after the first drone 206a has dropped the smart shopping bag 100' at the first warehouse 402a, the consumer may decide to order an additional item from the first merchant 400a. The additional item could be communicated directly to the computer devices at the first warehouse 402a (e.g., via the Internet), and the communication could include an identifier for the smart shopping bag 100 belonging to the consumer. The computer devices at the first warehouse 402a could communicate with the compute device 108 of the smart shopping bag 100 to identify the consumer's smart shopping bag 100 and place the additional item in the storage volume 104 of the smart shopping bag 100'.

In the exemplary scenario depicted in FIG. 7, the consumer has also ordered goods from a second merchant 400b operating a second warehouse 402b. After the goods from the first merchant 400a have been placed in the smart shopping bag 100' at the first warehouse 402a, the controller 204 can task a second drone 206b to pick up the smart shopping bag 100' at the first warehouse 402a and fly a route 704 that transports the smart shopping bag 100' to the second warehouse 402b. Once the second drone 206b delivers the smart shopping bag 100" to the second warehouse 402b, the second warehouse 402b can place ordered goods in the storage volume 104 of the smart shopping bag 100". For example, as described above, the computer device 108 of the smart shopping bag 100 can include goods for transport 122 stored in its memory 118. Computer devices associated with the second warehouse 402b could communicate with the computer device 108 of the smart shopping bag 100 via the wireless transceiver 114 to identify the goods for transport 122 that should be placed in the storage volume 104. The computer devices associated with the second warehouse 402b can then move the smart shopping bag 100" to a location or locations in which those goods can be placed in the storage volume 104.

After the goods from the second merchant have been placed in the smart shopping bag 100" of the second warehouse 402b, the controller 204 can task a third drone 206c to pick up the smart shopping bag 100" at the second warehouse 402b and fly a route 706 that transports the smart shopping bag 100" to the house 302. As demonstrated in the exemplary scenarios described above with reference to FIG. 7, a single smart shopping bag 100 can be used to receive and/or return goods to a number of different merchants, thereby reducing shipping and handling costs. Additionally, orders could be modified to add or remove items after placement without incurring additional shipping and handling costs.

Figure 8:
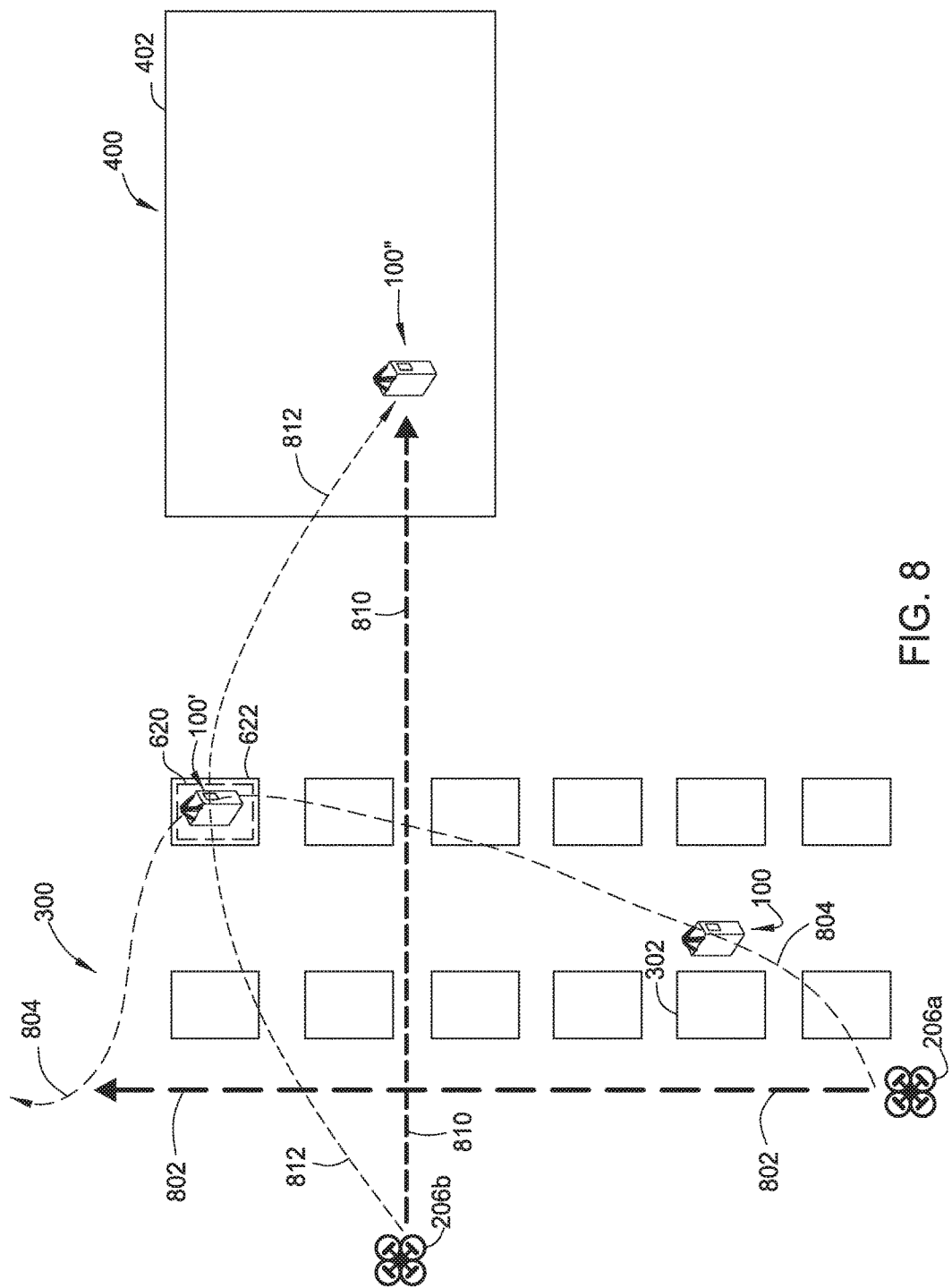
FIG. 8 is a schematic top view diagram illustrating a plurality of drones transporting a smart shopping bag between respective locations, absent centralized tasking from a controller.

In the above described embodiments and scenarios, the drones 206 are centrally controlled by the controller 204, meaning the controller 204 tasks drones 206 to transport smart shopping bags 100. In at least one embodiment, the drones 206 may operate autonomously without a central controller to deliver a smart shopping bag 100 from an origin location to a destination location. FIG. 8 illustrates a scenario in which autonomously operating drones 206 transport a smart shopping bag 100 from the house 302 to the warehouse 402 without central control. In the scenario, a package is delivered by a series of drones that individually determine whether to transport the smart shopping bag 100 based on whether they can move the smart shopping bag 100 closer to its destination. In the exemplary scenario, a first autonomous drone 206a is programmed to fly a certain preprogrammed route 802 indicated by a thick broken line. The first autonomous drone 206a is permitted to deviate from the preprogrammed route 802 by a certain amount to search for smart shopping bags 100 that are suitable for transport. In the exemplary scenario, the first drone 206a has deviated from its preprogrammed route 802 along a path 804 to check the house 302 for a smart shopping bag 100 that is suitable for transport. For example, consumers residing at the house 302 may subscribe to the drone delivery service, and the house 302 is within a threshold lateral distance of the preprogrammed route 802. As a result, the first drone 206a flying the first preprogrammed route 802 deviates to check the house 302 for a smart shopping bag 100 that is suitable for transport. Upon the first drone 206 finding the smart shopping bag 100 that is suitable for transport, the first drone 206a communicates with the compute device 108 of the smart shopping bag 100 to identify a destination for the smart shopping bag 100. Again, in the exemplary scenario, the smart shopping bag 100 is destined for the warehouse 402. The warehouse 402 does not lie along the preprogrammed route 802 for the first drone 206a, but the intermediate location 622 is within a threshold lateral distance of the preprogrammed route 802 and is closer to the warehouse 402 than the house 302. Since the first drone 206a can transport the smart shopping bag 100 to a location that is closer to the warehouse 402 and within a threshold lateral distance of its preprogrammed route 802, the first drone 206a picks up the smart shopping bag 100 at the house 302 and transports the smart shopping bag along the route 804 to the intermediate location 622. After leaving the smart shopping bag 100' at the intermediate location 622, the first drone 206a continues along the route 804 to resume its preprogrammed route 802.

A second drone 206b is programmed to fly another preprogrammed route 810 indicated by a thick broken line and is permitted to deviate from the preprogrammed route 810 to search for smart shopping bags 100 that are suitable for transport. In the exemplary scenario, the second drone 206b has deviated from its preprogrammed route 810 along a path 812 to check the intermediate location 622 for a smart shopping bag 100 that is suitable for transport. For example, the second drone 206 may be programmed to deviate from the preprogrammed route 810 to check the intermediate location 622 for smart shopping bags 100. Upon the second drone 206b finding the smart shopping bag 100 left by the first drone 206a, the second drone 206b communicates with the compute device 108 of the smart shopping bag 100 to identify a destination for the smart shopping bag 100. In this exemplary scenario, the warehouse 402 destination location lies along the second preprogrammed route 810. Therefore, the second drone 206b picks up the smart shopping bag 100 and continues along the path 812 to return to the preprogrammed path 810. Thereafter, the second drone 206b delivers the smart shopping bag 100" to the smart warehouse 402.

In the above-described scenario depicted in FIG. 8, the drones 206 operate autonomously from any central control and transport smart shopping bags from origin locations to destination locations in a "swarm" manner. When a drone encounters a smart shopping bag 100 that is suitable for transport, the drone only moves the smart shopping bag 100 if the particular drone can stay within a predetermined threshold distance of its preprogrammed route and can move the smart shopping bag 100 closer to its destination location. If the particular drone cannot move the smart shopping bag 100 closer to its destination location, then the particular drone does not move the smart shopping bag 100 such that a subsequent drone will move the smart shopping bag. If a particular drone cannot move the smart shopping bag closer to its destination location without exceeding a predetermined threshold distance from its preprogrammed route, then the particular drone does not move the smart shopping bag 100.

Figure 9:
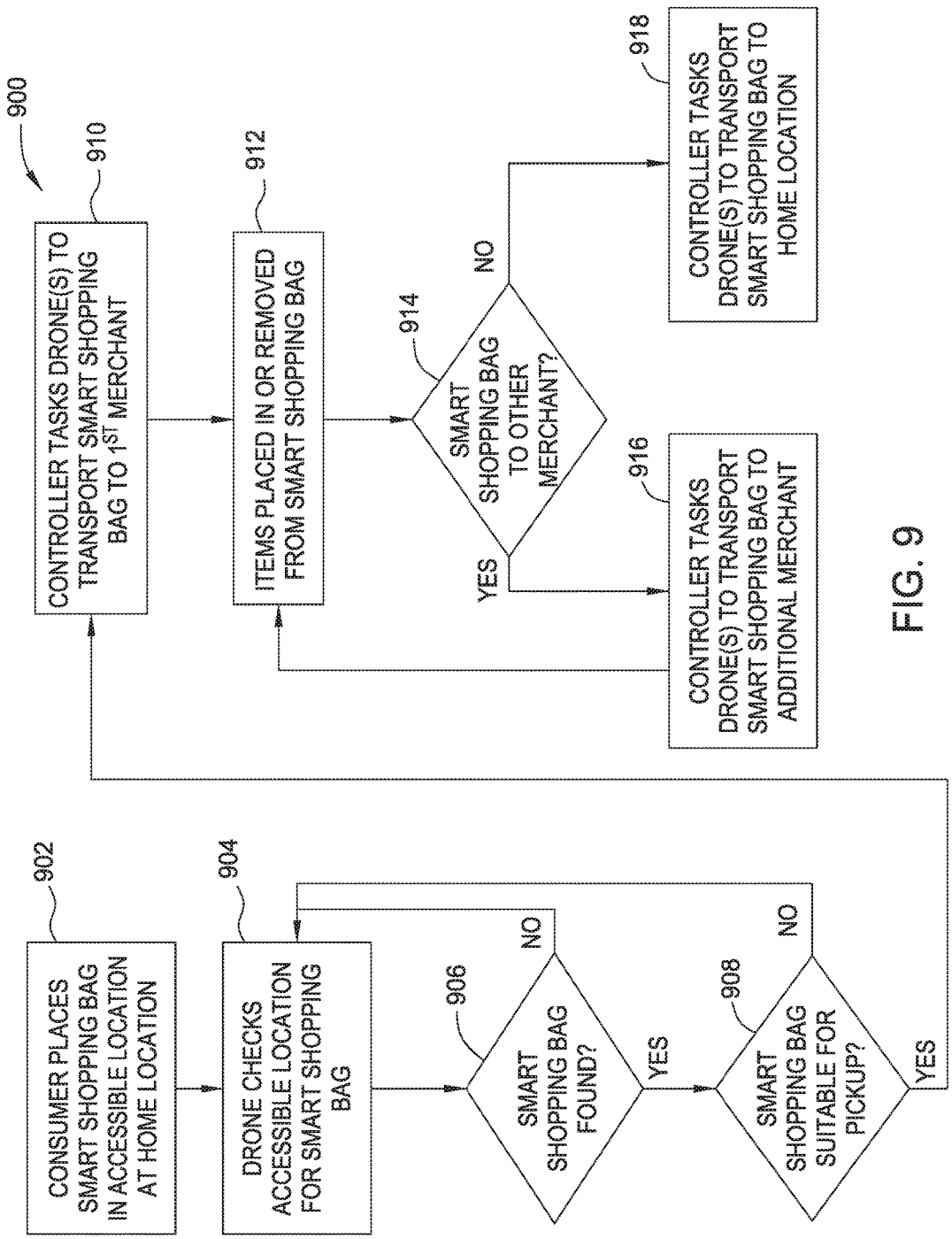
FIG. 9 is a flow chart of a method for transporting smart shopping bags using drones according to one embodiment.

FIG. 9 is a flowchart of a method 900 according to one embodiment for transporting goods using smart shopping bags. In block 902 of the method 900, a consumer places a smart shopping bag in an accessible location at their residence. For example, after placing items in a smart shopping bag 100 for return or upon ordering goods to be delivered via the smart shopping bag 100, the consumer may place the smart shopping bag 100 on a front porch, a front yard, or a backyard of their residence. In one embodiment, the consumer has a predetermined location in which the smart shopping bag 100 will be placed.

In block 904, a drone checks the predetermined location for the smart shopping bag. As discussed above, in one embodiment, every time a drone is in the vicinity of the predetermined location, the drone may move close enough to the predetermined location to communicate with a smart shopping bag 100 if a smart shopping bag 100 is present. In another embodiment, a controller for the drones may receive a communication that a smart shopping bag 100 is to be expected soon at the predetermined location. Thereafter, the controller may task drones in the vicinity of the predetermined location to move close enough to the predetermined location to communicate with a smart shopping bag 100 if a smart shopping bag 100 is present.

In block 906, the drone in the vicinity of the predetermined location checks for a smart shopping bag 100. If no smart shopping bag 100 is found, then that particular drone continues along its route. As a result, the method 900 returns to block 904 such that the next available drone checks for the smart shopping bag 100 at the predetermined location.

In block 908, after a smart shopping bag 100 has been found of the predetermined location, the drone checks to see whether the smart shopping bag 100 is suitable for pickup. For example, the user preferences 120 stored in memory 118 of the computer device 108 may indicate that the smart shopping bag 100 is not to be picked up until after a specific time. In such an exemplary scenario, if the current time is before the specified time, then the smart shopping bag 100 is not suitable for pickup. As another example, the smart shopping bag 100 may weigh more than what the drone is capable of lifting, based on other smart shopping bags 100 the drone is already carrying. In such a scenario, the smart shopping bag 100 is not suitable for pickup by that drone. In such a case, the particular drone continues along its route, and the method 900 returns to block 904 such that the next available drone checks for the smart shopping bag 100 at the predetermined location and (assuming the smart shopping bag 100 is still found) checks to see whether the smart shopping bag is suitable for pickup.

In block 910, after a drone has determined that a smart shopping bag 100 is suitable for pickup, a controller tasks one or more drones to transport the smart shopping bag to a first merchant. As discussed above, a single drone may transport the smart shopping bag 100 all the way to the first merchant. Alternatively, a plurality of drones may sequentially transport the smart shopping bag 100 along respective portions of a trip from the home location to the location of the first merchant.

In block 912, after the smart shopping bag 100 has been delivered to the first merchant, items are placed in or removed from the smart shopping bag 100. As discussed above, computer devices associated with the first merchant may communicate with the computer device 108 of the smart shopping bag 100 to determine which items to place in the smart shopping bag 100 and/or which items to remove from the smart shopping bag 100. The computer devices associated with the first merchant can use the information about items to place in or remove from the smart shopping bag 100 to automatically move the smart shopping bag 100 to one or more workstations in a warehouse for the first merchant to effectuate such item placements.

In block 914, the controller 914 can determine whether the smart shopping bag 100 is to be delivered to another merchant so that the other merchant can place and/or remove items from the smart shopping bag 100. In block 916, if the smart shopping bag 100 is to be delivered to another merchant, then the controller tasks one or more drones to transport the smart shopping bag from the first merchant to the next merchant. Thereafter, once the smart shopping bag 100 is delivered to the next merchant, the method returns to block 912, wherein the next merchant places items in order moves items from the smart shopping bag 100. Blocks 912, 914, and 916 repeat until the smart shopping bag 100 has been transported to all of the merchants that need to add items to or remove items from the smart shopping bag 100. Thereafter, in block 918, the controller tasks one or more drones to transport the smart shopping bag 100 back to the home location.

Figure 10:
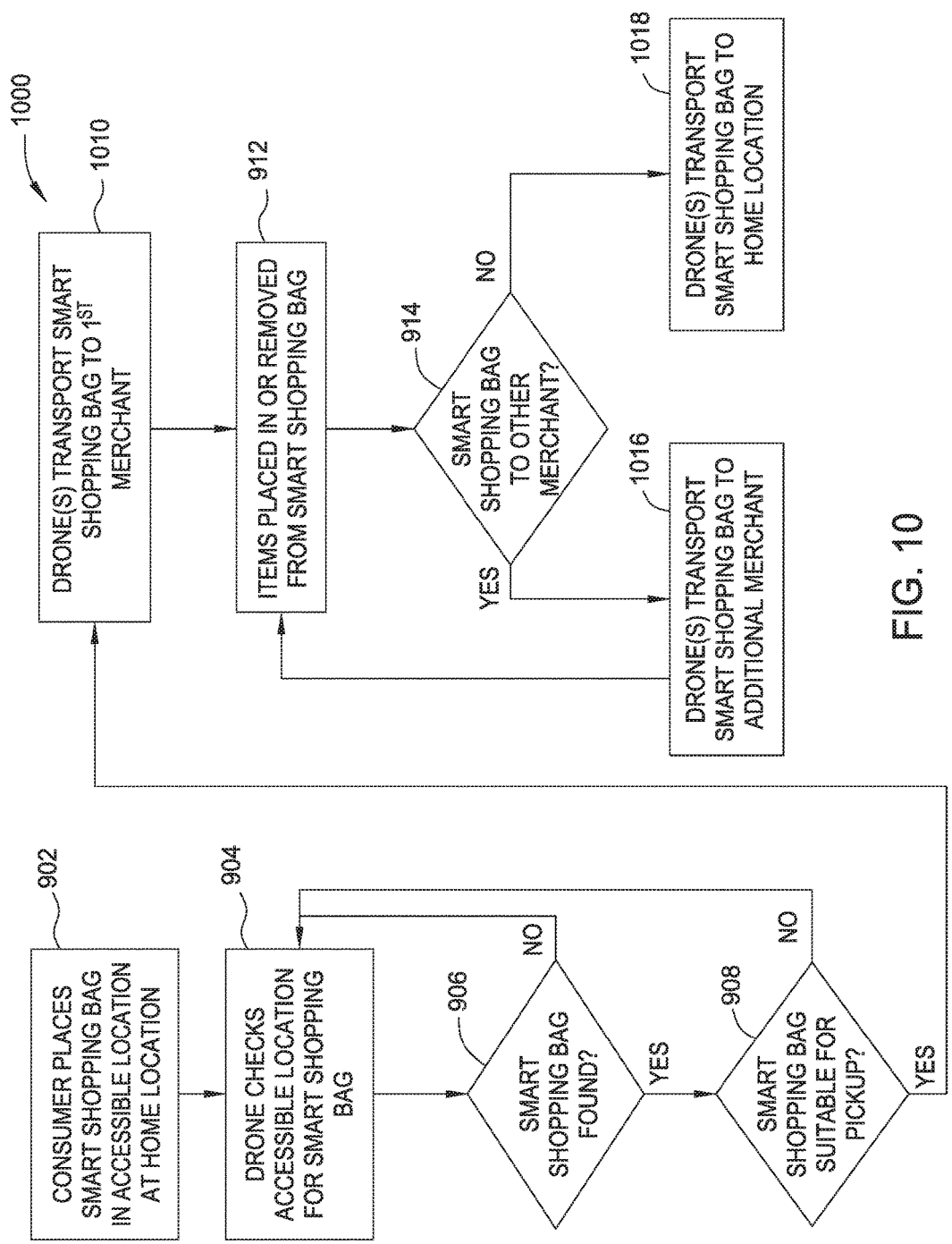
FIG. 10 is a flow chart of a method for transporting smart shopping bags using drones according to another embodiment.

FIG. 10 is a flowchart for another method 1000 for transporting smart shopping bags via drone, in which the drones are operated autonomously. In the method 1000 blocks 902, 904, 906, 908 are the same as in the method 900 illustrated in FIG. 9. In block 1010, after a drone has found a smart shopping bag that is suitable for pickup one or more drones transport the smart shopping bag to a first merchant. As discussed above, a first autonomous drone may carry the smart shopping bag 100 from the home location to a first intermediate location that is closer to the first merchant and is also within a threshold lateral distance of a predetermined route being flown by the first autonomous drone. Thereafter, a second autonomous drone may carry the smart shopping bag 100 from the first intermediate location to a second intermediate location that is even closer to the first merchant and is also within a threshold lateral distance of a predetermined route being flown by the second autonomous drone. Additional autonomous drones may continue to carry the smart shopping bag 100 incrementally closer to the first merchant until the smart shopping bag reaches the first merchant.

In block 912 of the method 1000, after the smart shopping bag 100 has reached the first merchant, items are placed in or removed from the smart shopping bag 100. In block 914, a drone can determine whether the smart shopping bag 100 is to be delivered to another merchant so that the other merchant can place and/or remove items from the smart shopping bag 100. For example, the drone may access the destinations for goods 124 in the memory 118 of the computer device 108 to determine if there are additional locations the smart shopping bag 100 needs to go to. In the event the smart shopping bag 100 is to be transported to an additional merchant, in block 1016, one or more drones transport the smart shopping bag 100 to the additional merchant. Again, a series of autonomous drones may incrementally move the smart shopping bag 100 from the first merchant to the second merchant via intermediate locations until the smart shopping bag 100 reaches the second merchant. Blocks 912, 914, and 1016 repeat until the smart shopping bag 100 has been transported to all of the merchants that need to add items to or remove items from the smart shopping bag 100. Thereafter, in block 1018, one or more drones transport the smart shopping bag 100 back to the home location.

In the embodiments described herein, a consumer may purchase goods from a variety of online merchants and receive those goods in a consolidated manner in accordance with user preferences, such as delivery times and/or security settings. Additionally, the consumer may return goods to the online merchants without having to interact with a third-party shipper. In many instances, the consumer may merely have to place the items to be returned in the smart shopping bag 100 and place the smart shopping bag 100 outside their residence to handle the return.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a menu selection description modification application) or related data available in the cloud. For example, the menu selection description modification application could execute on a computing system in the cloud and provide modified menu selection descriptions. In such a case, the menu selection description modification application could generate the search query based on a menu selection description (block 402 in FIG. 4), transmit the search query and receive results (block 404), parse the results to identify at least one alternative menu selection description (block 406), and modify the menu selection description to include the alternative menu selection description (410). The menu selection description modification application could then store the modified menu selection description at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A system, comprising:
    a wireless transceiver; and
    a controller in communication with, via the wireless transceiver, a plurality of drones operable to transport a smart shopping bag, wherein the smart shopping bag is configured to store goods for transport, and wherein the smart shopping is operable to store and wirelessly communicate user preferences, information related to stored goods, and one or more destinations for the goods, wherein the one or more destinations comprise a location a drone is to transport the smart shopping bag to obtain the goods,
    the controller operable to:
        receive an indication that the smart shopping bag is ready for transport from a first location to a second location; and
        task one or more of the plurality of drones to transport the smart shopping bag from the first location to the second location upon receiving the indication that the smart shopping bag is ready for transport.

2. The system of claim 1, wherein the plurality of drones are configured to communicate with the smart shopping bag via a short-range wireless communication protocol.

3. The system of claim 2, wherein at least one of the plurality of drones is configured to periodically pass proximate to the first location such that the at least one of the plurality of drones can communicate with the smart shopping bag via the short-range wireless communication protocol to receive the indication that the smart shopping bag is ready for transport, and wherein the controller receives the transmitted indication from the at least one of the plurality of drones.

4. The system of claim 1, wherein the controller is configured to receive a signal comprising the indication from a computer associated with the first location.

5. The system 1, wherein tasking the one or more of the plurality of drones to transport the smart shopping bag comprises tasking a first one of the plurality of drones to pick up the smart shopping bag at the first location and drop off the smart shopping bag at the second location.

6. The system of claim 5, wherein the controller is configured to task the first one of the plurality of drones to drop off the smart shopping bag at the second location upon receiving an indication from the second location that a person is present to receive the smart shopping bag.

7. The system of claim 5, wherein the controller is configured to transmit a delivery signal to the second location upon the first one of the plurality of drones dropping off the smart shopping bag at the second location.

8. The system of claim 1, wherein tasking the one or more of the plurality of drones to transport the smart shopping bag comprises tasking a first one of the plurality of drones to pick up the smart shopping bag at the first location and drop off the smart shopping bag at an intermediate location and tasking a second one of the plurality of drones to pick up the smart shopping bag at the intermediate location and drop off the smart shopping bag at the second location.

9. The system of claim 1, wherein tasking the one or more of the plurality of drones to transport the smart shopping bag comprises transmitting the second location to the plurality of drones, wherein, in response to receiving the transmitted second location, a first one of the plurality of drones passing close to the first location and heading in a direction toward the second location transports the smart shopping bag from the first location to an intermediate location and then a second one of the plurality of drones passing close to the intermediate location and heading in a direction toward the second location transports the smart shopping bag from the intermediate location to the second location.

10. A method for transporting items, comprising:
    receiving an indication that a smart shopping bag is ready for transport from a first location to a second location, wherein the smart shopping bag is configured to store goods for transport, and wherein the smart shopping bag is operable to store and wirelessly communicate user preferences, information related to stored goods, and one or more destinations for the goods, wherein the one or more destinations comprise a location a drone is to transport the smart shopping bag to obtain the goods; and transmitting commands to at least one drone to transport the smart shopping bag from the first location to the second location.

11. The method of claim 10, wherein the indication is received from a drone that passes in proximity to the first location to communicate with the smart shopping bag.

12. The method of claim 10, wherein transmitting commands to the at least one drone comprises transmitting commands to a first one of the least one drone to transport the smart shopping bag from the first location to an intermediate location and transmitting commands to a second one of the at least one drone to transport the smart shopping bag from the intermediate location to the second location.

13. The method of claim 10, wherein transmitting commands to the at least one drone comprises transmitting commands to a first one of the least one drone to transport the smart shopping bag from the first location to the second location.

14. The method of claim 10, further comprising transmitting commands to the at least one drone to delay delivery at the second location until an indication that a person is present to receive the smart shopping bag.

15. The method of claim 10, further comprising transmitting a delivery signal to the second location upon the smart shopping bag being dropped off at the second location.

16. The method of claim 10, wherein transmitting commands to at least one drone to transport the smart shopping bag from the first location to the second location comprises transmitting the second location to the plurality of drones, wherein a first one of the plurality of drones passing close to the first location and heading in a direction toward the second location transports the smart shopping bag from the first location to an intermediate location and then a second one of the plurality of drones passing close to the intermediate location and heading in a direction toward the second location transports the smart shopping bag from the intermediate location to the second location.

17. The method of claim 10, further comprising:
at least one of adding an item to the smart shopping bag or removing an item from the smart shopping bag.

18. A system, comprising:
a plurality of drones, wherein each of the plurality of drones is operable to:
    travel to a plurality of designated locations to search for a smart shopping bag, wherein the smart shopping bag is configured to store goods for transport, and wherein the smart shopping bag is operable to store and wirelessly communicate user preferences, information related to stored goods, and one or more destinations for the goods, wherein the one or more destinations comprise a location a drone is to transport the smart shopping bag to obtain the goods;
    upon finding the smart shopping bag at a designated location, querying the smart shopping bag to determine whether the smart shopping bag is suitable for pick up by the drone; and
    upon determining that the smart shopping bag is suitable for pickup, transporting the smart shopping bag toward a first one of the one or more destinations.

19. The system of claim 18, wherein the smart shopping bags store user preferences related to at least one of pick up times or drop off times.

20. The system of claim 18, wherein the drones collaborate to determine one or more drones to carry the smart shopping bag from the designated location.

* * * * *